United States Patent [19]

Baudermann

[11] Patent Number: 5,361,485
[45] Date of Patent: Nov. 8, 1994

[54] TRANSFER LINE FOR MACHINING WORKPIECES ESPECIALLY FOR MACHINING DIFFERENTIAL HOUSINGS

[75] Inventor: Adolf Baudermann, Nurtingen, Germany

[73] Assignee: Giddings & Lewis GmbH, Am Neckar, Germany

[21] Appl. No.: 979,148

[22] Filed: Nov. 23, 1992

[51] Int. Cl.$^5$ .............................................. B23Q 7/04
[52] U.S. Cl. ...................................... 29/563; 29/558; 408/70; 414/783
[58] Field of Search .................. 29/563, 33 D, 558; 408/3, 44, 45, 53, 69, 70; 409/84, 158, 163, 164, 172, 174, 193; 414/729, 783

[56] References Cited

U.S. PATENT DOCUMENTS

| | | | |
|---|---|---|---|
| 595,044 | 12/1897 | Church | 408/20 X |
| 2,642,179 | 6/1953 | Cross | 409/158 X |
| 2,654,463 | 10/1953 | Church | 408/70 X |
| 2,690,572 | 10/1954 | Thompson et al. | 408/69 X |
| 2,895,354 | 7/1959 | Hawkinson et al. | 408/44 X |
| 3,425,073 | 2/1969 | McMurray | 408/69 X |
| 4,443,937 | 4/1984 | Dominici et al. | 408/44 X |
| 5,005,274 | 4/1991 | Timell | 29/33 P |

FOREIGN PATENT DOCUMENTS

| | | | |
|---|---|---|---|
| 3928139 | 2/1991 | Germany . | |
| 1117192 | 10/1984 | U.S.S.R. | 29/563 |
| 1284789 | 1/1987 | U.S.S.R. | 29/563 |

OTHER PUBLICATIONS

Dr. Ing. Wolfgang Hahn and Ing. Ulrich Beurer, tz fur Metallbearbeitung 76, Dec. 1982, pp. 13-19.

Primary Examiner—Z. R. Bilinsky
Attorney, Agent, or Firm—Foley & Lardner

[57] ABSTRACT

A transfer line for machining differential housings, in which the outer surface of the workpiece is clamped against angled locating surfaces in each work rest. The workpiece is rotated through 90° and located against a work rest in a successive machining station which is oriented 90° to the first mentioned work rest locating surfaces so that the same locating points on the workpiece are used for locating in the successive machining station despite the workpiece having been rotated to enable machining from a different angle.

13 Claims, 5 Drawing Sheets

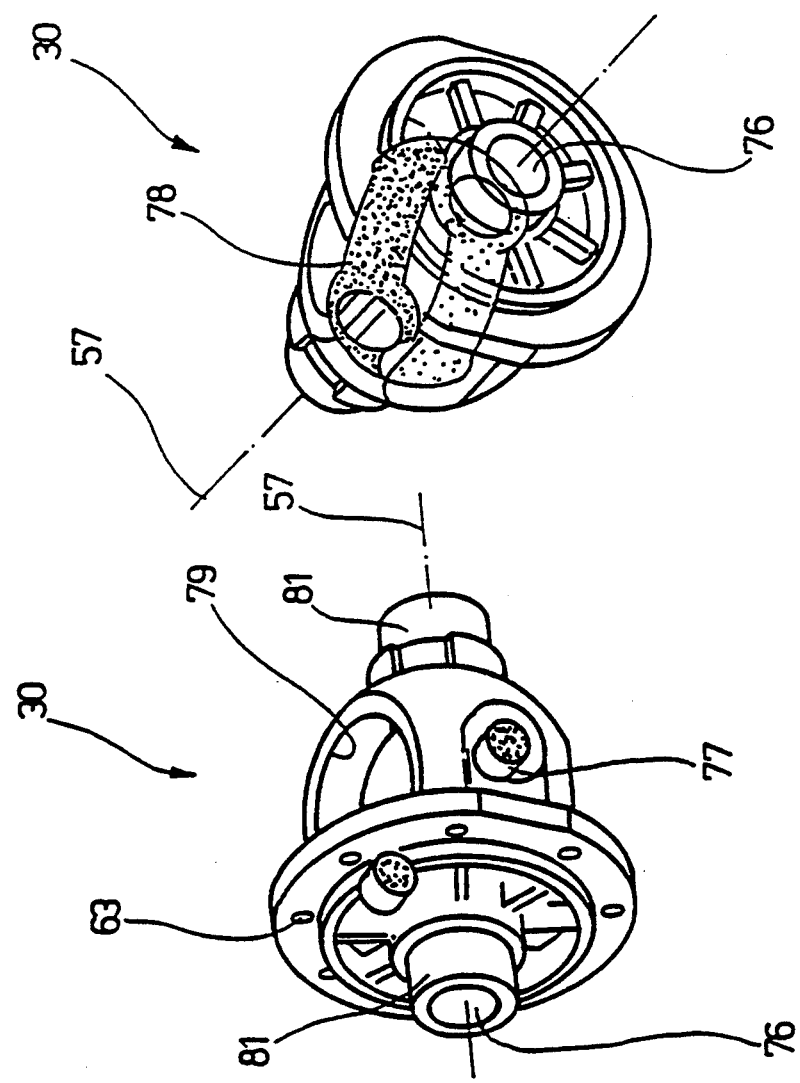
Fig. 6
Fig. 5
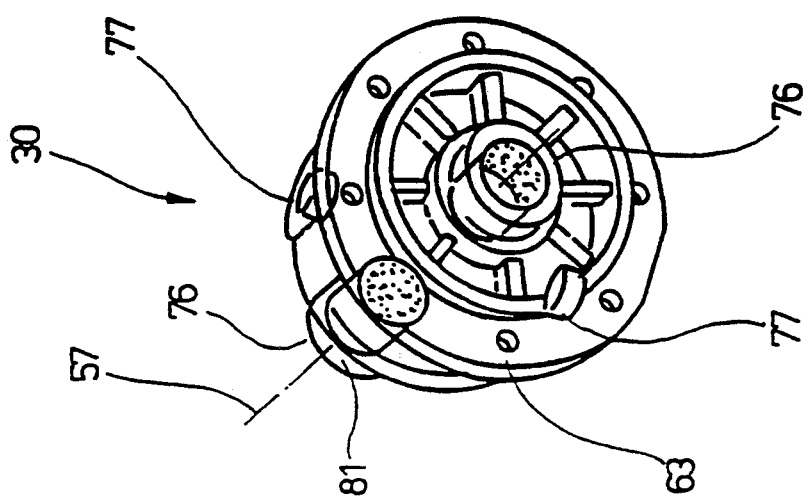
Fig. 4

TRANSFER LINE FOR MACHINING WORKPIECES ESPECIALLY FOR MACHINING DIFFERENTIAL HOUSINGS

BACKGROUND OF THE INVENTION

The invention relates to a transfer line transferring workpieces along a series of machining stations.

In the production of workpieces involving metal cutting operations it is common to use transfer lines which are adapted for the machining of a particular type of workpiece or for machining a limited number of similar types of workpieces. The transfer line is equipped with machining work stations through which the workpieces pass in series, in a predetermined sequence.

At each of the machining work stations, machining devices perform special machining operations on each workpiece that passes through the station.

The particular workpiece that is being machined is securely retained in a suitable device during the machining operation and is then transported by a transfer system to the next station. Depending on the type of the transfer line and its intended use, the workpiece retaining devices are either of a first unfixturized type that are fixed in position, or are of a second type comprising pallets which move through the transfer line fixed to the workpiece.

In order to ensure unobstructed workpiece access by the machining devices the unfixturized workpiece transfer method is often preferred over the pallet-type method, especially when the workpiece to be machined has a relatively intricate configuration.

This is particularly true in the case of metal cutting machining operations performed on differential housings that are used as driveline components in automobiles. These housings must be machined, successively, from at least four different directions which are oriented at right angles relatively to one another. In order to ensure a close tolerance dimensional accuracy, the workpieces must be clamped in each of the machining work stations, and close tolerances must be held each time. The equipment of the machining work station usually remains unchanged since individual adjustment of each station to each workpiece passing through the station would not be desirable in terms of economy and efficiency.

One prior transfer line for the machining of differential housings is of the type in which the machining stations are interlinked by an overhead transfer system. The individual machining stations, which are provided with horizontally oriented as well as vertically suspended machining spindles, are equipped with stationary work rests into which the workpieces are deposited and retained by clamping devices during the machining operation.

In order to enable machining operations to be carried out from all sides of the workpiece, horizontally positioned machining spindles are placed at varying angles relative to the transfer direction. Some of the machining stations are positioned at a right angle relative to the transfer direction, whereas others are positioned at a 45° angle. This requires that the particular workpiece to be machined must be turned several times by the transfer mechanism about its vertical axis and be inserted into the work rest at a corresponding angular position. The work rests are each provided with two locating surfaces which are oriented at right angles to one another and are inclined at an angle of 45° relative to the horizontal axis.

The positioning of the machining stations at varying angles with respect to the transverse direction not only results in an irregular arrangement of the transfer line and the need for extra space, but it also makes it difficult, because of the inclined positioning of some of the machining stations, to locate a transfer mechanism below the conveying level of the workpieces. It is for that reason that an overhead transfer system must be used which, in turn, impedes the access to the workpieces from the top. This makes it necessary to equip the machining stations with vertically suspended tool machine spindles with specially designed and costly mechanisms for the transport of the workpieces to and from the machining stations.

In recognition of the foregoing limitations, it is the object of the present invention to provide a transfer line which is characterized by a simple and open configuration by its reduced space requirements, and by the fact that the machining operations on the workpiece can be carried out with the required precision.

SUMMARY OF THE INVENTION

This objective is accomplished by a transfer line in which work rests are provided which locate each workpiece against identical surface features but with the workpiece in a related position to allow machining from different angles.

The work rests are able to position the axial centerlines of the workpieces transversely of the transfer direction in all machining stations, which allows horizontally oriented machine tool spindles to be placed at right angles relative to the transfer direction. This results in a simple and compact arrangement of the transfer line, and the absence of obliquely positioned machining stations enables the use of an below located transfer system.

The use of a transfer system acting from below makes possible the installation of compact machining stations, with vertically suspended machine tool spindles, and eliminates the need for costly specially designed mechanisms for the workpiece transfer. Since the arrangement permits, if necessary, the workpieces to be turned between two machining stations at an angle about their respective axial centerlines, which are always positioned transversely of the direction of operating cycle movement, the vertically suspended tool spindles are able to machine in the successively arranged machining stations the bores or surfaces on the particular workpiece which are oriented at an angle to each other that correspond to the angle at which the workpiece had been turned.

One important advantage in the arrangement of the work rests according to the present invention is that the same contact areas between the workpiece and the locating surfaces of the work rests are always used as contact areas even when the workpieces are turned about their axial centerline. This will eliminate additional errors that might be encountered in the event different contact areas are used for different machining operations.

Extremely close tolerances between the machining steps in the different machining stations are achieved if the work rests of the different machining stations are turned about the axes extending transversely of the transfer direction at the same angular distance as the angular distance at which the workpieces are turned about their axial centerline. This means that the workpieces are clamped in each machining station with the same contact areas against the work rest locating surfaces even if the particular workpiece is turned between the machining stations.

In accordance with one embodiment of the present invention which is particularly suitable for machining differential housings, the work rests in at least two successively arranged machining stations, are relatively rotated at an angle of 90° relative to each other. This feature permits the use of respective vertically suspended machining units of different machining stations for successively machining transverse bores on the workpiece which are perpendicularly positioned relatively to each other.

In one particularly advantageous embodiment, each work rests in the machining stations is provided with at least one horizontally oriented locating surface and at least one locating surface that is positioned vertically thereto. This will make possible on the one hand, the use of uniform work rests for the entire transfer line, and on the other hand, that the axial forces exerted by the vertically suspended machining spindle are acting vertically towards the locating surfaces, thereby assisting the same to be easily received.

A relatively simple workpiece transfer system may be realized in that a turning station is provided between the two machining stations in which the workpieces are to be inserted and machined after having been turned into suitable rotated positions relative to each other. Thus, the turning operation of the workpiece and the operation of feeding the same and removing it from the machining stations can be carried out independently from each other by the provision of a separate turning station that is adapted for operation independently from the transfer system.

The feeding of the workpieces to the turning station can be carried out relatively easily if the turning station is equipped with work rests. This will enable the workpieces to be fed to and removed from the turning station by the transfer system without the need for any auxiliary equipment.

The turning of the workpieces is effected, preferably, by gripping arms provided in the turning station which are mounted for pivoting movement about a transverse axis. The gripping arms are adapted for picking up and depositing the workpieces in a position that is attained after a 90° turn of the workpiece about its axial centerline. Thus, the transporting of the workpiece and the turning of the same through an angle of 90° can be coordinated in a relatively simple manner.

According to one particularly simple arrangement in which any additional adjusting means can be omitted, the gripping arms are mounted for pivoting movement between two limit positions which are forming a right angle. This is the case when the transverse axis is arranged midway between the work rests and is displaced downwardly by half the distance of the same. This will accomplish that the workpiece is automatically turned through an angle of 90°.

Preferably, locking means are provided on the gripping arms for receiving the workpieces and for coupling the same to the gripping arms. This will prevent unwanted turning movement of the workpieces during the turning operation.

To keep the locking means relatively simple in structure the invention proposes that it be in the form of pins with engagement shoulders, with the pins being adjustable transversely to the cycling direction.

To effect proper adjustment of the workpieces in the machining stations, especially with respect to the angular positioning about the axial centerline of the same, the invention proposes that the adjusting means be in the form of indexing bolts which are adapted for engagement transversely to the cycling direction in at least one of the indexing bores. In many instances the workpiece is already provided with flange bores so that no additional operations are necessary.

DESCRIPTION OF DRAWINGS

FIG. 4 is a perspective view of a workpiece to be machined in the transfer line, with highlighting of the axial bore and the transverse bore.

FIG. 5 is a perspective view of workpiece to be machined in the transfer line with highlighting of the transverse bore.

FIG. 6 is a perspective view of the workpiece to be machined in the transfer line with highlighting of the spherical surface.

DETAILED DESCRIPTION

Figure 1:
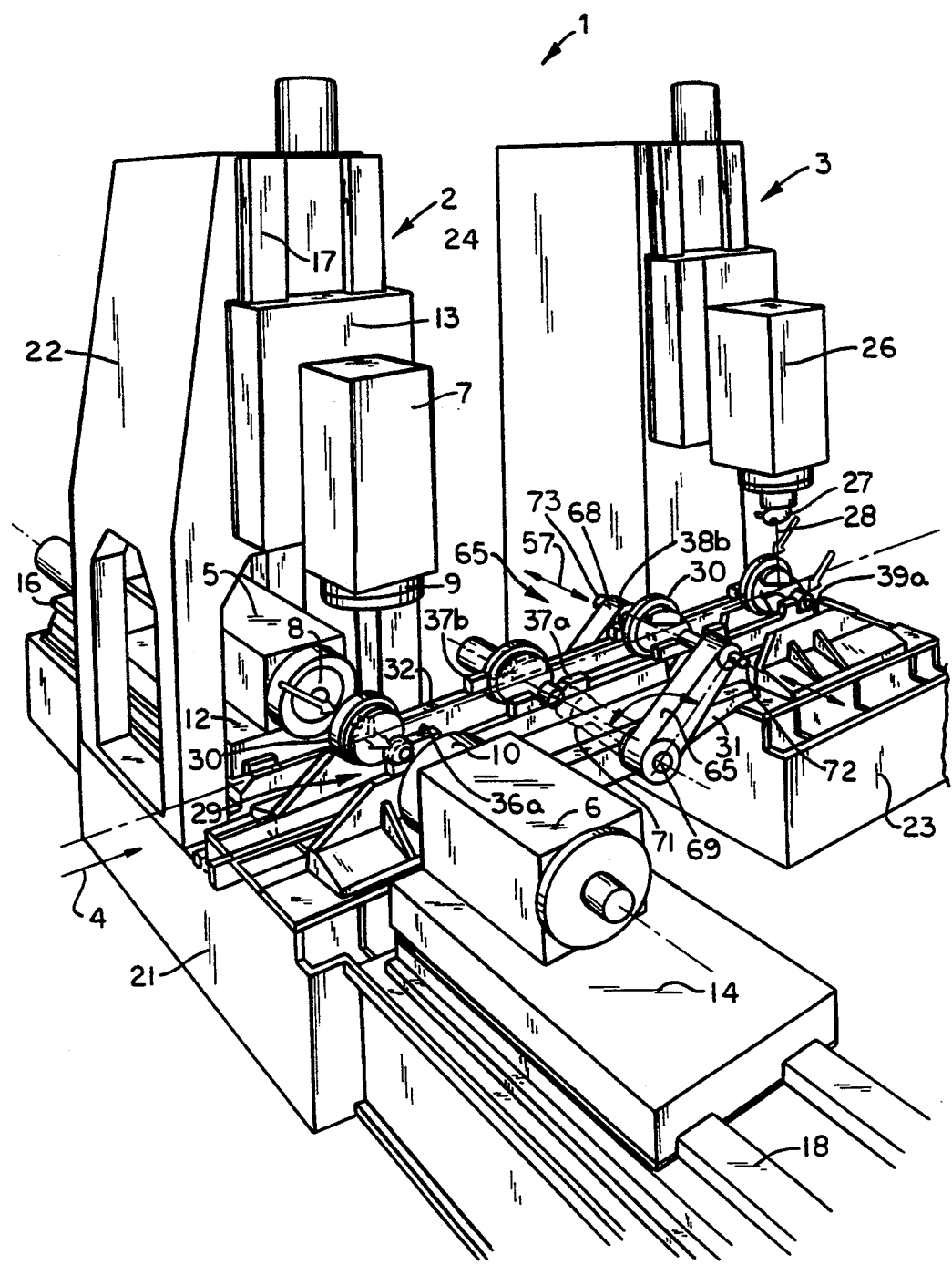
FIG. 1 is a fragmentary perspective view of two machining stations of a transfer line.

FIG. 1 illustrates a cut-away portion of a transfer line 1 with machining stations 2, 3. The machining stations 2, 3 are typical of all other machining stations (not shown in the drawing) of the transfer line 1, with the exception that the machining of the workpieces 30 in the machining station 2 is carried out at an angle relative to the workpiece 30 then in the machining station 3.

Figure 3:
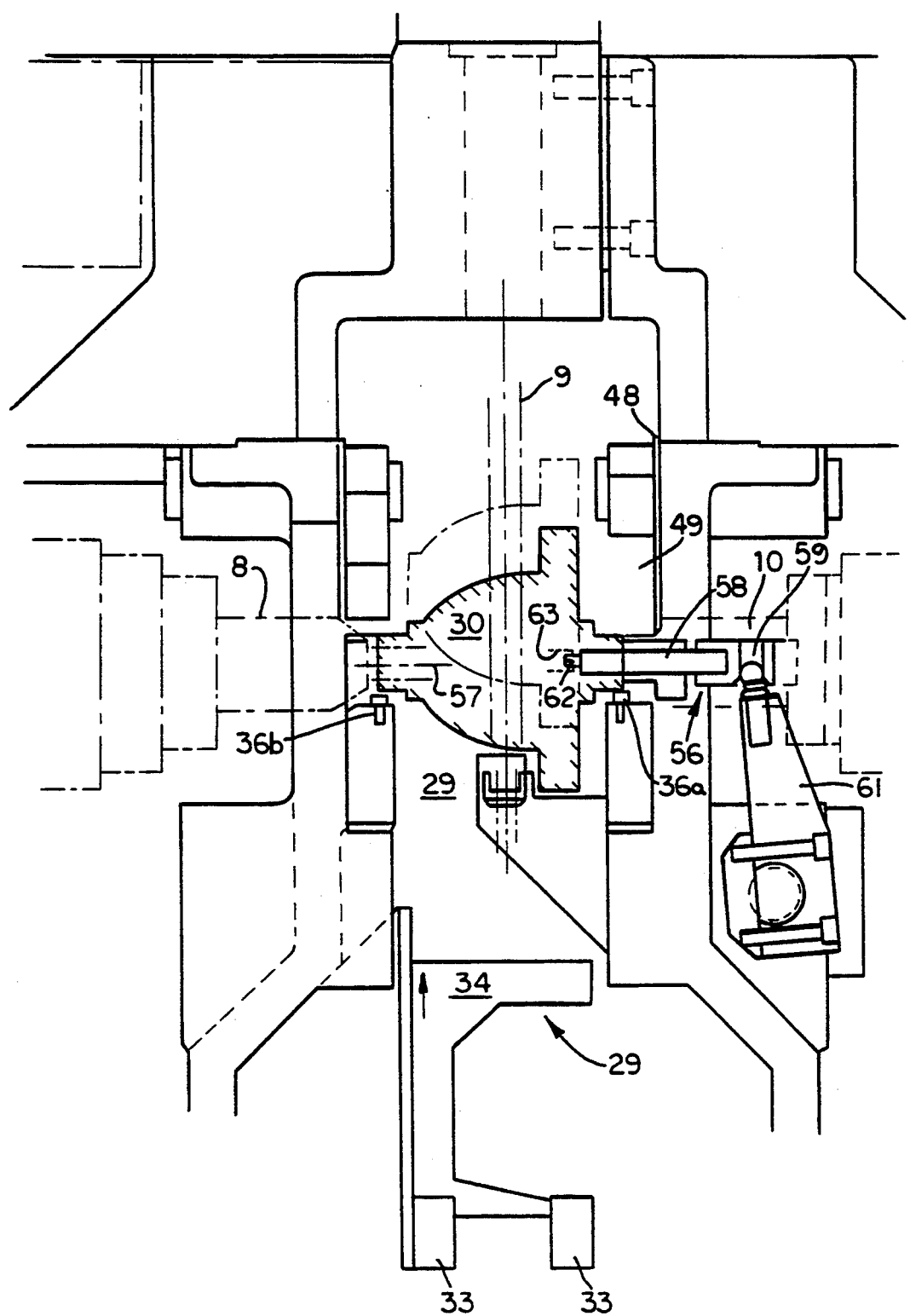
FIG. 3 is a front elevation view of the machining station of the transfer line according to FIG. 1 viewed in the opposite direction from the direction of transfer advance.

The machining station 2, which with respect to the transfer direction indicated by an arrow 4, is located rearwardly, includes two horizontally positioned machining units 5, 6 which are arranged perpendicular to the transfer direction, as well as a vertical machining unit 7. The machining stations 5, 6, 7 are equipped with tool spindles 8, 9, 10 respectively which are indicated in FIG. 3 only by dash-dotted lines and in which are mounted the machining tools.

The machining units 5, 6, 7 are mounted by way of sleds 12, 13, 14 on beds 16, 17, 18, respectively, in a manner that will enable the machining units to carry out a feed motion towards the workpiece 30.

The beds 16, 18 accommodating the horizontal machining units 5, 6, respectively, are mounted on a base structure 21 that is common for the entire machining station 2. The base structure 21 is sufficiently rigid so that all forces that are generated during the machining operations of the workpiece can be easily absorbed. The base structure 21 has mounted thereon a top structure 22 for supporting the bed 17 of the vertical machining unit 7. The top structure is also sufficiently rigid so as to ensure that no deformations are being encountered that would impair the machining precision.

Likewise the machining work station 3, which is succeeding, as viewed in the transfer direction, the machining work station 2, has a base structure 23 which supports a top structure 24 for guiding a vertical machining unit 26. The machining unit 26 includes a tool spindle 27 adapted to rotate about a vertical axis 28.

All machining work stations of the transfer line 1 are interconnected, in a sequential order determined by the requirements of the particular application by a transfer mechanism 29 which is provided for the transport of the workpieces 30.

The transfer mechanism 29 is of the type referred to as a unfixtured workpiece transfer method wherein the workpieces 30 are transported without the use of workpiece pallets or the like and are clamped in each of the work stations 2, 3.

The transfer system 29 includes a base frame 31 for interconnecting the machining work stations 2, 3 which is retained on the machining work stations 2, 3. The base frame 31 has mounted thereon a right and left support rail 32. Between the support rails 32, which are arranged rigidly and stationary with respect to the machining stations, are arranged two transfer bars 33 (FIG. 3).

The bars 33, which are recessed and therefore not visible in FIG. 1, are driven by a transfer mechanism of the conventional type and are adapted for movement in strokes for advance and downward movement. As illustrated only in FIG. 3, the transfer bars 33 have mounted thereon a support member or adapter 34, the size and shape of which is complementary to that of the workpieces 30 so as to ensure proper retention and support of the same during the transfer cycle.

The machining stations 2, 3 as well as the intermediate stations are equipped with workpiece receiving rests for receiving the workpieces 30. As is apparent especially from the schematic illustration of FIG. 2, the workpiece receiving rests 36, 37, 38, 39 arranged in as well as between the machining stations 2, 3. The work rests 36, 37, 38, 39 are fastened to the support rails 32 in such a manner that the workpieces are always positioned transversely to the transfer direction. Furthermore, the work rests 36–39 are spaced apart from each other at essentially equal distances. This will enable, during the workpiece transfer, the workpieces 30 to be lifted out of one work rest and to be deposited into the one that is next in line with respect to the operating cycle direction.

In FIG. 1 the work rests 36–39 mounted on the right-hand support rail 32 are designated by the letter "a" and, in order to be able to differentiate between the two, the ones mounted on the left-hand support rail 32 are identified by the letter "b".

Reference symbols without identification in the following specifications refer to the work rests mounted on the right as well as on the left support rail 32.

Figure 2:
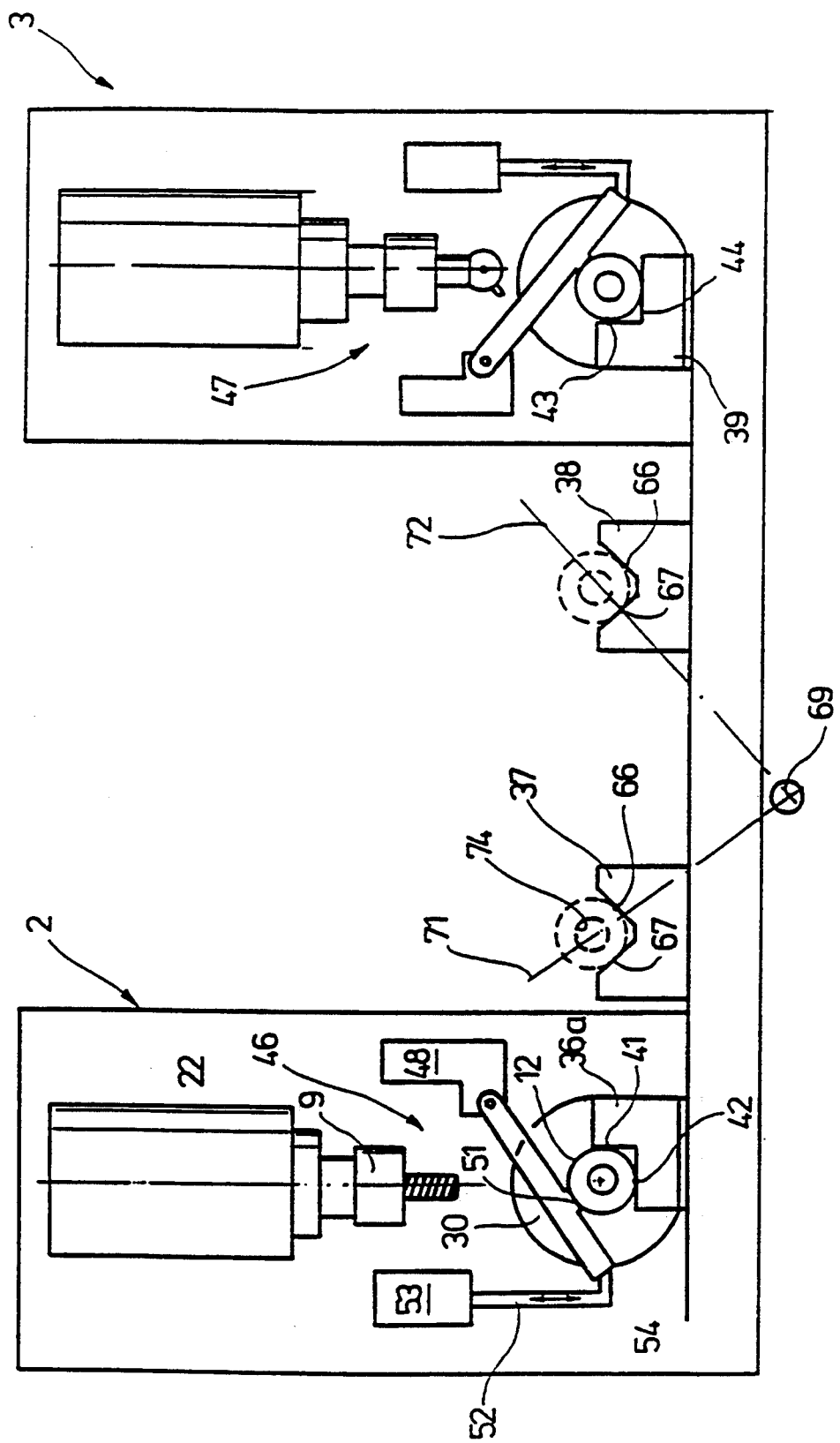
FIG. 2 is a diagrammatic side elevation view of the cut-away portion of the transfer line shown in FIG. 1.

As apparent from FIG. 2, the work rests 36 for the machining station 2 has two orthogonal locating surfaces 41, 42, surface 41 being vertical, and surface 42 horizontal.

As is also apparent from FIG. 2, one leg of the right angle formed by the locating surfaces 41, 42 is pointing upwardly, and the other leg is oriented horizontally and pointing in the direction opposite to the transfer movement.

The work rests 36a and 36b are positioned in such a manner that the horizontal surfaces 42 are in mutual alignment and the vertical surfaces 41 are in mutual alignment. The vertical surfaces 41 are positioned parallel to the beds 16, 18 provided for guiding the horizontal machining units 5, 6.

As is apparent from FIG. 3, the work rests 39 in the machining station 3 also has locating surfaces 43, 44 which are form a right angle, the one surface being vertically and the other being horizontally oriented.

As far as the alignment of the locating surfaces 43, 44 is concerned, the same is true as has been indicated with respect to the surface 41, 42 of the work rests 36. However, unlike the work rest 36 described above, the horizontally oriented leg of the angle formed by the work rest 39 points in the transfer direction.

Figure 8:
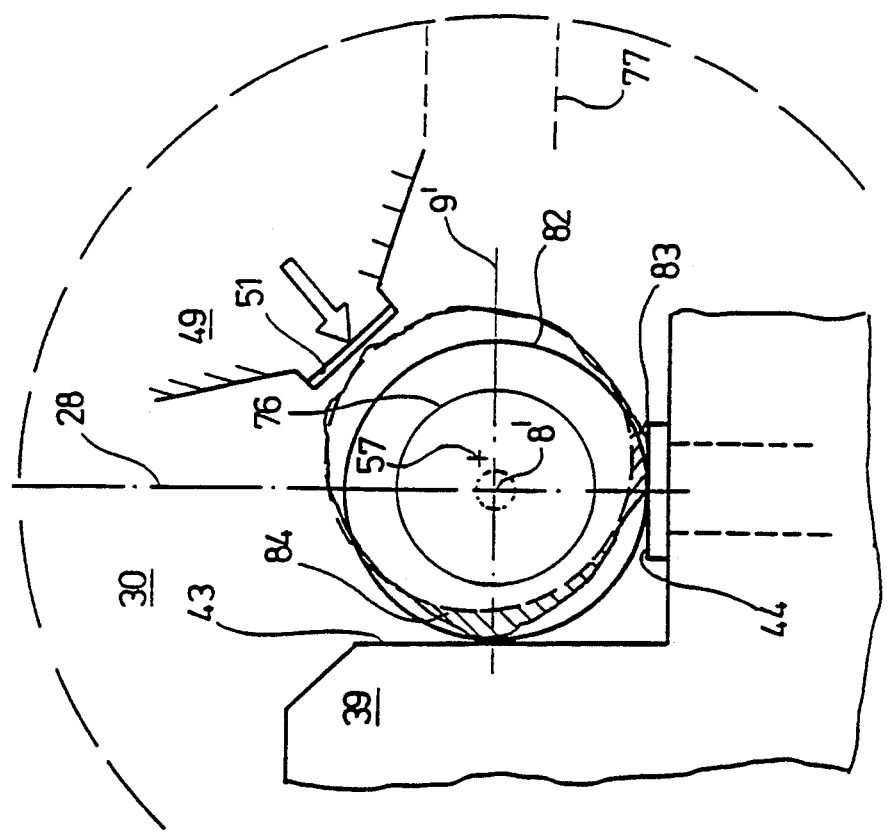
FIG. 8 a side elevation view of the locating relationship when a workpiece is placed in another machining station of a transfer line according to FIG. 1.
Figure 7:
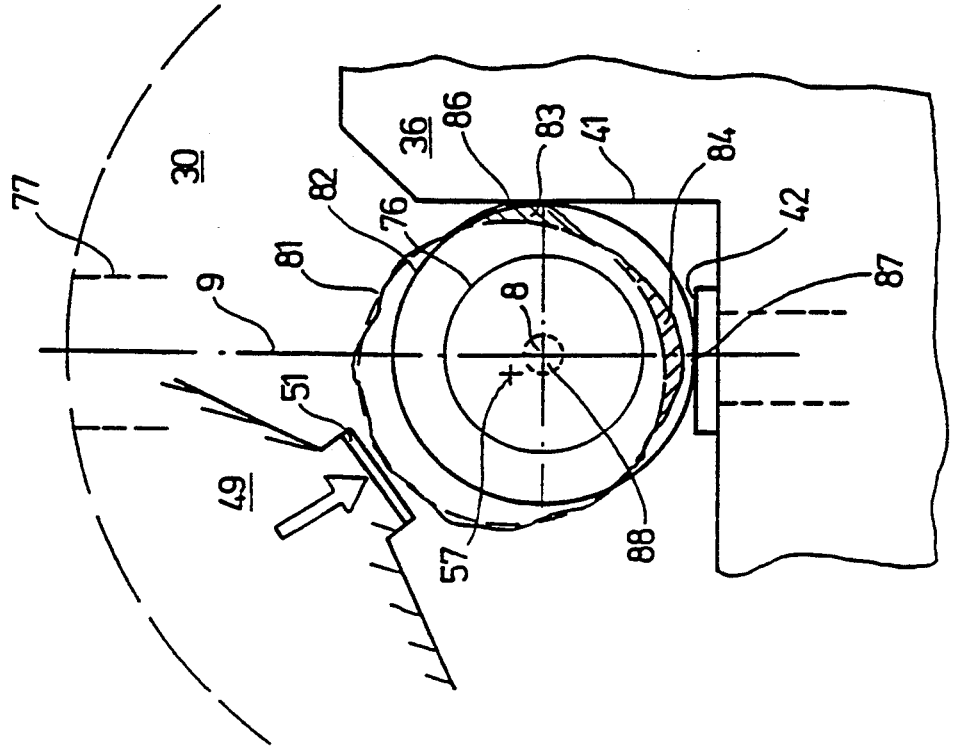
FIG. 7 is a side elevational view illustrating the locating relationship when a workpiece is placed in a first machining station of a transfer line according to FIG. 1.

As apparent from FIG. 7 and 8, the horizontally oriented locating surfaces 42, 43 are the end faces of exchangeable adjusting bolts which are insertable in corresponding bores of the work rests. The vertically oriented locating surfaces 41, 43 are formed by the surfaces of the massive work rests 36, 39 themselves.

The work rests 36, 39 arranged in the machining work stations 2, 3 are provided with hydraulically operated clamping devices 46, 47 which are adapted to clamp the respective workpieces 30 into position for machining. The clamping devices are designed to release the workpieces 30 for the transfer of the same. As indicated in FIG. 3, and schematically illustrated in FIG. 2, the clamping device 46 includes an abutment 48 which is mounted to the structure 22, with a clamping lever 49 pivotally mounted to the abutment 48 for fixing the workpiece 30 radially into position. A clamping jaw 51 is provided approximately midway of the clamping lever 49 and is located opposite the work rests 36.

The free end of the clamping lever 49 is connected, by way of a ball joint, with a clamping rod 52 which is adapted for up and down movement in the direction of arrow 54, with the movement being effected by a hydraulic drive unit 53.

The clamping mechanism 47 in the machining station 3 is the same as the clamping device 46 described above and for that reason the individual components of the clamping device 47 are designated by the same reference numerals as the ones used in the clamping device 46.

In addition to the clamping devices 46, 47 the machining stations 2, 3 include locating mechanisms 56 for properly aligning the particular workpiece 30 about its axial centerline extending transversely of the transfer direction.

The locating mechanism 56 is illustrated in FIG. 3, and includes an indexing bolt 58 that is guided in the structure 22 and is adapted for axial movement (in FIG. 3 towards the right and left side) relative to the workpiece 30.

The indexing bolt 58 is connected through a joint 59 with a hydraulically driven, pivotally mounted lever 61. The end 62 of the indexing bolt is pointed towards and engaging the workpiece 30. The diameter of the indexing bolt 58 corresponds to a flange bore 63 arranged in the proximity of the circumference of the workpiece 30 and oriented in the axial direction thereto, that bore serving in this instance as indexing bore 63.

The stroke of the indexing bolt 58 is dimensioned so as to be moved into the indexing bore 63 and also to be able to be completely disengaged therefrom.

If the indexing bolt 58, after insertion into the indexing bore 63, is not in proper alignment with the bore, the chamfered end 62 of the indexing bolt is used to turn the workpiece slightly about its axial centerline 57 until the indexing bore 63 and the indexing bolt 58 are in proper alignment.

A turning station 65 is located intermediate the machining work stations 2, 3 which is designed to turn the workpieces about their axial centerlines through an angle of 90° (FIG. 1). The entrance and exit of the turning station 65 is formed by the work rests 37, 38. The work rests 37, 38 arranged on the support rails 32 between the machine stations 2, 3, have engagement surfaces 66, 67 which are oriented, relative to the horizontal plane, at an angle of 45° and are open at the top.

The work rests 37a and 37b are in mutual alignment when viewed from the side. The work rests 38a, 38b are also arranged so as to be in alignment when viewed from the side. This will provide that the axial centerlines of workpieces 30 in the work rests 37, 38 are oriented, here too, transversely of the transfer direction. Furthermore, the turning station 65 has two gripping arms 68 which are mounted on the base frame 31 for pivoting movement between two limit positions 71, 72 about a pivoting axis 69, one of the gripping arms 68 being mounted on the right hand side and the other on the left hand side of the base frame 31, and both arms 68 pointing upwardly. The pivoting axis 69 is oriented horizontally and transversely of the transfer direction and is arranged midway between the work rests 37, 38, but is displaced downwardly by half the distance of the same. The gripping arms 68 will assume the one limit position 71 when they are positioned adjacent the work rest 37, and the other limit position when they are positioned adjacent the successive work rest 38. The limit positions 71, 72 form a right angle with one another.

The gripping arms 68 have on their pivotable free ends a coupling device 73 for locking the gripping arms 68 to the workpiece 30. A relatively simple structure of the coupling mechanism would be in the form of a hydraulically operated pin 73 with an engagement shoulder which is adapted to engage in an axial bore 74 of the workpiece 30.

The workpieces 30 to be machined on the transfer line may be differential housings 30, as illustrated in FIGS. 4, 5 and 6, which are produced in large numbers in the automobile industry. The differential housing 30 has a number of surfaces that are to be machined in succession, of which one bore 76 which is extending coaxially with axial centerline (identical with the axial bore 74), one transverse bore 77 which is extending perpendicularly thereto, and one spherical surface 78 inside the differential housing 30 must be machined. The spherical surface 78 is accessible and is to be machined through a mounting opening 79, the axis 81 of which extends perpendicular to the axis of the transverse bore 77. The axial bore 76 extends through two essentially cylindrical positions 81 (seat for the bearing) which previously have been only rough-finished.

The transferline described above operates as follows:

The differential housing 30 emerging from preceding machining stations (not illustrated in FIG. 1) is inserted by the transfer line into the work rest 36. Upon downward movement of the transfer bars 33 and the adapter 34 seated thereupon, the differential housing 30, together with the portions 81, is initially placed only loosely onto the locating surfaces 42. The flange bore, which in this instance also serves as the indexing bore 63, is positioned ahead of the indexing bolt 58 and is in approximate alignment therewith. In the following step the lever 61 is pivoted inwardly (in FIG. 3 towards the left), which will cause the indexing bolt 58 to be inserted into the indexing bore 63. The chamfered end 62 will then precisely position the indexing bore 63 (shown very clearly in FIG. 4) ahead of the indexing bolt while the differential housing 30 is turned slightly about its axial centerline 57. This will correct any minor inaccuracies which may occur, for instance, when the differential housings 30 is slightly displaced during the workpiece transfer between two machining stations.

Once the differential housing 30 is properly aligned, the clamping levers 49 are lowered and the clamping jaws 51 are pressed tightly against the portions 81.

FIG. 7 illustrates the rough-finished portion 81 after having been inserted and clamped into the work rest 81.

For the sake of clarity, the representation of FIG. 7 has been reduced to a simple, greatly schematized illustration. Also for the sake of clarity, the usually minor irregularities caused by the rough-finish machining of the portion 81, are greatly exaggerated in the illustration.

The circle 82 indicates the position that would be assumed by the portion 81 if it were ideally round. The center of this circle coincides exactly with the axis of the tool spindle 8. But in reality, the position of the portion 81 varies from the position of circle 82. In the example shown, the axial centerline 57 of the differential housing 30 has been displaced upwardly, as indicated by the hatched areas 83, 84 which are continuous with the retaining surfaces 41, 42 in the contact areas 86, 87 and they are therefore not in alignment with the tool spindle 8. In this position, the axial bore 76 and the transverse bore 77 are machined successively in the machining station 2 by the horizontal machining unit 5, 6 and the vertical machining station 7, respectively. Regardless of the absolute position of the differential housing 30, the tool spindles 8, 9 will be in mutual alignment so that the axial bore 76 and the transverse bore 77 will be intersecting at a point 88.

At the end of the machining operation in the machining station 2, the differential housing 30 will be released from the clamping mechanism 46, and the indexing bolt 58 will be pulled out of the indexing bore 63.

The differential housing 30 is now lifted out, with an upward motion, of the work rests 36 by the transfer mechanism 29, removed from the machining work station 2 in the direction of transfer movement, placed to the turning station 65, turned 90° in the turning station 65 about its axial centerline 57 (in FIG. 2 in clockwise direction) and deposited in the work rest 39 of the machining station 3. A more detailed description of the operation will be found toward the end of the specification.

FIG. 8 illustrates the differential housing 30 inserted in the work rest 39. The transverse bore is now oriented horizontally of the direction of cycle operation movement. Just like the differential housing 30, the retaining surfaces 44, 43 of the machining station 31 are also displaced at an angle of 90° in clockwise direction relative to the locating surfaces 41, 42 of the machining station 2 (FIGS. 7, 8). Since the angle by which the retaining surfaces 41, 42 have been displaced corresponds to the angle by which the differential housing 30 has been turned, the differential housing 30 in the work rest 39 engages the same contact areas 86, 87 as the ones in the work rest 36. The axial centerline 57 has been displaced upwardly with respect to the center of circle 82 which marks the position of an ideally round portion 81. The actuation of an indexing device provided in the machining station 3 will cause the differential housing 30, just as in the machining station 2, to be aligned and thereafter to be clamped into position by means of the clamping mechanism 47.

FIG. 8 illustrates only one portion of the clamping lever 49 with the clamping jaw 51 which exerts a force in the direction indicated by the arrow against the portion 81 of the differential housing 30. In this position into which the differential housing has been placed the machining of the spherical surface 78 indicated in FIG. 6 can now be carried out.

The spherical surface 78 is being machined with a tool that has been inserted into the tool spindle 27 and which rotates about the axis of rotation 28. Since the same contact areas 86, 87 are used for the clamping of the differential housing 30 as these used in the preceding machining operation, the axis of rotation 28 meets the axes of the tool spindles of the preceding machining operations at the point of intersection 88 without the need for any additional adjustments. Even though the differential housings 30 has been turned between the two machining stations 2, 3, the machining operations carried out in the machining stations 2, 3 are true to dimensions relative to each other. This will be true regardless of the actual size height of the raised areas 83, 84. This will ensure that, regardless of any incidental variations of the axial centerline 57 from the desired position determined by the tool spindle 8, by using one and the same contact areas 86, 87 for clamping the differential housing 30, the axes will meet at the same point of intersection 88 in all machining stations.

For the further machining of the outer surfaces which up this point have only been machined to a rough finish, use is made of one of the finished bores, preferably the bore 76, as a reference surface.

The operation of the turning station 65 which has only been mentioned in passing heretofore, is geared precisely to the geometric relationships of the workpiece to be finished in this instance the differential housing 30, is as follows:

A differential housing which has been machined in the machining station 2 is first released by the clamping mechanism 46. The transfer mechanism 29 grasps the differential housing 30 and initially moves it upwardly until it is positioned above the work rest 36. A movement of the transfer bars 33 in the direction of cycle operation movement 4 will cause the differential housing 30 to be moved above the work rest 37 and to be inserted therein as the transfer rods are being lowered.

Since the differential housing has not been turned up to this point, the transverse bore 77 machined by the machining unit 9 is still vertically oriented.

The turning operation of the differential housing 30 proceeds as the gripping arms 68 pivot into the limit position 71 adjacent the work rest 37. The pin 73 which is movably mounted in the right-hand gripping arm 68 as well as in the left hand gripping arm 68 is in substantial alignment with the axial bore 76 of the differential housing 30. To lock the differential housing 30 into position, the pins 73 are hydraulically actuated and moved into the axial bore 76 until an engagement shoulder provided on the pins 73 (not shown in the drawings) is in engagement with the opening of the axial bore 76. In this position the differential housing 30 is fixedly coupled, except for minor turning moments, to the gripping arms 68. Actuation of a suitable drive mechanism will cause the gripping arms 68 to be pivoted about the pivoting axis 69 through an angle of 90° to the work rest 38 and the limit position 72.

Because of the rigid coupling with the differential housing 30, the housing 30 will be turned through an angle of 90°. When the gripping arms are positioned precisely next to the work rest 38, the differential housing 30 will be inserted into the work rest 38. To release the differential housing 30, the pins 73 are removed from the axial bore 73 and the differential housing 30 will then rest loosely in the work rest 38. The transverse bore, which was originally in a vertical position is now oriented horizontally in the direction of cycle movement. In this position the differential housing 30 is picked up by the adapter of the transfer mechanism 29, is lifted out from the work rest 38, is moved in the direction of cycle movement up to the work rest 39 and is deposited therein.

Depending on the need and the angle at which the machining operations are carried out in the successive machining stations, the turning mechanism 65 can be adapted for operation with a great variety of turning movements. This will require only a change in the length of the gripping arms and a corresponding positioning of its pivoting axis.

I claim:

1. A multistation transfer line for machining a series of workpieces each having a round outer surface, the transfer line comprising:
    a series of successive workstations, whereat said machining takes place, at least two of said workstations having respective stationary work rests; and
    a transfer system for advancing a series of workpieces through each of said work rests by lifting, advancing, and depositing said workpieces in said work rests successively;
    each of said work rests including at least two fixed locating surfaces extending at a predetermined angle to each other and adapted to engage said round outer surface of each workpiece at points angularly spaced apart, said transfer system including means for rotating each of said workpieces through said predetermined angle during transfer between successive workstations, said locating surfaces in said successive workstations oriented in a shifted position rotated through said predetermined angle so that each workpiece is contacted at the same points on said round outer surface by said locating surfaces in said successive machining stations.

2. The transfer line according to claim 1 wherein said locating surfaces extend at right angles to each other such that said predetermined angle is approximately ninety degrees.

3. The transfer line according to claim 2 wherein said transfer line further includes a clamping means acting on each work pieces after being deposited in each work rest, acting to forcing each workpiece against said locating surface.

4. The transfer line according to claim 1 wherein said successive machining stations comprise means for boring axial bores extending transversely to said direction of transfer.

5. A transfer line for machining differential housing workpieces having a center axis and axial and transverse bores, the transfer line comprising:

a series of machining stations for machining said differential housing axial and transverse bores in successive stages;

a transfer system for transporting said workpieces between said machining stations in a transfer direction;

a series of workpiece receiving devices, each device being arranged in proximity to a respective machining station; and a clamping and locating linkage configured to position the workpieces in said respective receiving devices, wherein each workpiece receiving device includes two rigid contact surfaces extending at right angles to one another for locating said workpieces in a machining position on two portions of a respective workpiece, with said contact surfaces contacting the workpiece at the same contacting points in all the machining stations, said workpiece center axes of all workpieces being aligned transversely to said transfer direction in all of said machining stations;

said workpieces being deposited in at least two successive machining stations in rotated positions which differ from one another by rotation about said workpiece center axis, said contact surfaces of said workpiece receiving devices of successive machining stations extending at right angles to one another such that said contacting points at which said contact surfaces respectively contact said workpieces are the same in each successive machining station.

6. A method of machining bores in a workpiece having a rounded outer surface, said bores extending axially into said workpiece, comprising the steps of establishing a series of successive machining stations whereat said bores are to be machined in successive stages;

providing work rests at each station, each work rest having locating surfaces extending at a fixed angle to each other, but a successive work rest being oriented at a predetermined rotated angle with respect to a previous work rest;

clamping each workpiece with angularly spaced points on said rounded outer surface said locating surfaces of a first one of said work rests and carrying out said first stage of machining;

releasing and transferring said workpiece to said successive work rest, rotating said workpiece through said predetermined angle and depositing said workpiece in said successive work rest so that said same points are against said rotated locating surfaces;

clamping said workpiece against said locating surfaces and carrying out said machining of said axial bores.

7. A multistation transfer line for machining workpieces, comprising:

a first workstation and a second workstation generally aligned in a transfer direction, each of the first and second workstations being configured to perform an operation on a workpiece having an axis generally transverse to the transfer direction;

a first work rest disposed proximate the first workstation, the first work rest having a first pair of locating surfaces disposed at a predetermined angle with respect to each other, the first pair of surfaces being configured to receive the workpiece and support it at respective contact points;

a second work rest disposed proximate the second workstation, the second work rest having a second pair of locating surfaces disposed at the predetermined angle with respect to each other; and a transfer system configured to transfer the workpiece from the first work rest to the second work rest while rotating the workpiece a predetermined number of degrees about its axis, wherein the second pair of locating surfaces are disposed to contact the workpiece at the contact points.

8. The multistation transfer line of claim 7, wherein the transfer system includes an upstream intermediate work rest disposed between the first work rest and the second work rest, and a downstream intermediate work rest disposed between the upstream intermediate work rest and the second work rest.

9. The multistation transfer line of claim 8, wherein the transfer system includes:

a transfer mechanism configured to grip each workpiece and move it from the first work rest to the upstream intermediate work rest and from the downstream intermediate work rest to the second work rest; and a rotation mechanism configured to move the workpiece from the upstream intermediate work rest to the downstream intermediate work rest and to rotate the workpiece the predetermined number of degrees.

10. The multistation transfer line of claim 9, wherein the rotation mechanism includes a pivotable arm to which the workpiece is rigidly attached during movement from the upstream intermediate work rest to the downstream intermediate work rest, the pivotable arm pivoting the predetermined number of degrees.

11. The multistation transfer line of claim 10, further comprising a pair of clamps which securely hold the workpiece in position against the first work rest and the second work rest, respectively.

12. The multistation transfer line of claim 11, wherein the workpiece is a differential housing.

13. The multistation transfer line of claim 7, wherein the predetermined angle is less than 180 degrees.

* * * * *